United States Patent
Gross et al.

(10) Patent No.: US 7,307,952 B2
(45) Date of Patent: Dec. 11, 2007

(54) METHOD AND APPARATUS TO DETERMINE WHETHER DATA FLOW IS RESTRICTED BY A SENDING NODE, A RECEIVING NODE, OR BY A NETWORK

(75) Inventors: Gerhard W. Gross, Portland, OR (US); James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1085 days.

(21) Appl. No.: 10/324,974

(22) Filed: Dec. 20, 2002

(65) Prior Publication Data
US 2004/0120255 A1    Jun. 24, 2004

(51) Int. Cl.
    *H04L 1/00*    (2006.01)
(52) U.S. Cl. .................. 370/232; 370/394; 370/470
(58) Field of Classification Search ........ 370/229–232, 370/389, 394, 470
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 5,937,169 A | * | 8/1999 | Connery et al. | 709/250 |
| 6,058,312 A | * | 5/2000 | Kimura | 455/445 |
| 6,215,769 B1 | * | 4/2001 | Ghani et al. | 370/230 |
| 6,477,590 B1 | | 11/2002 | Habusha et al. | |
| 2002/0068588 A1 | * | 6/2002 | Yoshida et al. | 455/461 |

OTHER PUBLICATIONS

J. Postel, "The TCP Maximum Segment Size and Related Topics", Nov. 1983, Network Working Group, Request for Comments: 879, p. 1-11.*
"http://www.ietf.org/rfc/rfc0791.txt?number=791(17of52)", Internet header format, Nov. 15, 2002, 1 page.
"TCP", Mike Smith, 4 pages, 2002.

* cited by examiner

*Primary Examiner*—Hassan Kizou
*Assistant Examiner*—Bo Hui A Zhu
(74) *Attorney, Agent, or Firm*—Schwabe, Williamson & Wyatt, P.C.

(57) ABSTRACT

A method and apparatus to determine whether data flow is restricted by a sending node, a receiving node, or by a network. One embodiment of the invention comprises selectively reading a Sequence Number field (SN) and a Data Offset field (DO) from a Transmission Control Protocol (TCP) header in a data packet from a sender to a receiver. Selectively reading a Total Length field (TL) and an Internet Header Length field (IHL) from an Internet protocol (IP) header in the data packet from the sender to the receiver. Selectively reading an Acknowledgment Number field (AN) and a Window field (W) from a TCP header in a data packet from the receiver to the sender. And, using at least one of the SN, DO, TL, IHL, AN, and W from a network communication session to determine whether the sender, the receiver, or whether the network restricts data flow.

22 Claims, 5 Drawing Sheets

US 7,307,952 B2

METHOD AND APPARATUS TO DETERMINE WHETHER DATA FLOW IS RESTRICTED BY A SENDING NODE, A RECEIVING NODE, OR BY A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field of the Invention

The invention is related to the field of network communications. In particular, the invention is related to a method and apparatus to determine whether data flow is restricted by a sending node, a receiving node, or by a network.

2. Description of the Related Art

Transmission Control Protocol/Internet Protocol (TCP/IP) is a communications protocol developed under contract from the U.S. Department of Defense to internetwork dissimilar systems and is the protocol used in a majority of communications between a sender (sending node) and a receiver (receiving node) in a network e.g., the Internet.

The Transmission Control Protocol (TCP) provides transport functions, which ensures that the data bytes sent by a sender is received correctly by a receiver at its destination. The Internet Protocol (IP) does not ensure delivery of a complete message; an IP sending layer merely accepts packets from the TCP layer and adds its own header to form a "datagram". IP contains at least a network address and allows for the routing of messages. Please see Internet Request For Comment (RFC) 793 for more details on TCP, and Internet RFC 791 for more details on IP. TCP/IP is used to route data from the sender to the receiver and to ensure that the receiver correctly receives the data sent by the sender. TCP/IP has not been used to determine whether the sender restricts data flow, whether the receiver restricts data flow, or whether the network restricts data flow. Determining these problems is essential in order to ensure efficient data flow in the network.

BRIEF SUMMARY OF THE DRAWINGS

Example embodiments of the invention are illustrated in the accompanying drawings. The accompanying drawings, however, are not intended to limit the scope of the invention. Similar references in the drawings indicate similar elements.

DETAILED DESCRIPTION

Described is a method and apparatus to determine whether data flow is restricted by a sending node, a receiving node, or by a network. One embodiment of the invention comprises reading a Sequence Number field (SN) and a Data Offset field (DO) from a Transmission Control Protocol (TCP) header in a data packet from a sender to a receiver. Reading a Total Length field (TL) and an Internet Header Length field (IHL) from an Internet protocol (IP) header in the data packet from the sender to the receiver. Reading an Acknowledgment Number field (AN) and a Window field (W) from a TCP header in a data packet from the receiver to the sender. And, using at least one of the SN, DO, TL, IHL, AN, and W from a network communication session in a function to determine whether the sender restricts data flow, whether the receiver restricts data flow, or whether the network restricts data flow.

In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

The invention may utilize a distributed computing environment. In a distributed computing environment, program modules may be physically located in different local and remote memory storage devices. For example, the program code for determining whether the sender, the receiver, or the network restricts data flow may be disposed on the sender, the receiver, or at an intermediate point in the network between the sender and the receiver. Execution of the program modules may occur locally in a stand-alone manner on the same server, or evaluation of the program modules may occur remotely in a client/server manner. Examples of such distributed computing environments include local area networks, enterprise-wide computer networks, and the global Internet. Lastly, repeated usage of the phrase "in one embodiment" does not necessarily refer to the same embodiment, although it may.

Figure 1:
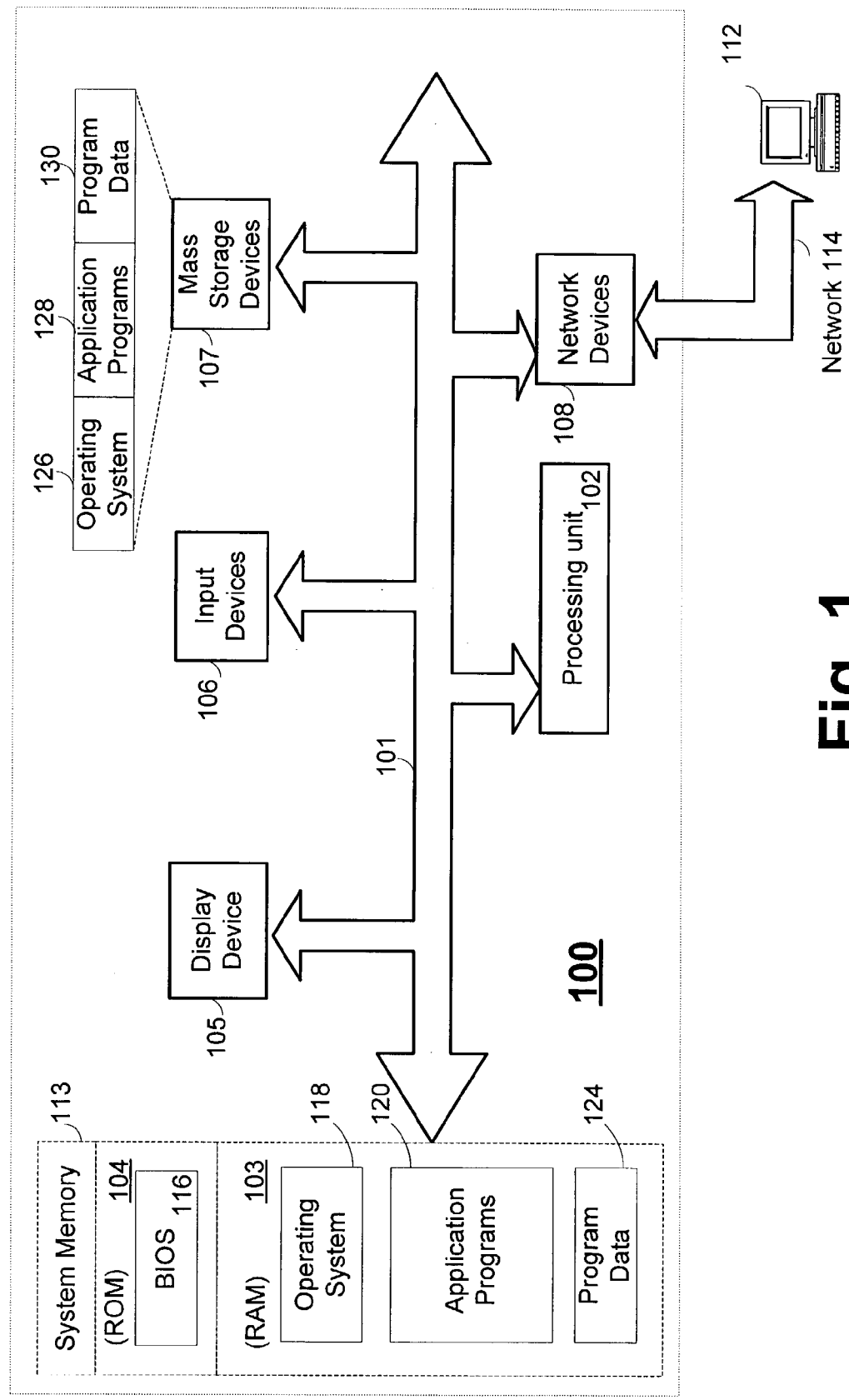
FIG. 1 illustrates a block diagram of a computer system that may be used to determine whether a sender restricts data flow, whether a receiver restricts data flow, or whether a network restricts data flow.

FIG. 1 illustrates a block diagram of a computer system that may be used to determine whether a sender restricts data flow, whether a receiver restricts data flow, or whether a network restricts data flow. In general, the computer system 100 may comprise a processing unit 102 communicatively coupled through a bus 101 to system memory 113, mass storage devices 107, Input devices 106, display device 105 and network devices 108.

Bus 101 may be any of several types of bus structures including a memory bus, a peripheral bus, and a local bus using any of a variety of bus architectures. System memory 113 comprises a read only memory (ROM) 104 and random access memory (RAM) 103. ROM 104 comprises basic input output system (BIOS) 116. BIOS 116 contain the basic routines, e.g., start up routines, that facilitate the transfer of information between elements within computer system 100. RAM 103 includes cache memory and comprises operating system 118, application programs 120, and program data 124. Application programs 120 include the program code for implementing the method described with reference to FIGS. 2-5. Program data 124 may include data generated by application programs 120. Mass storage device 107 represents a persistent data storage device, such as a floppy disk drive, fixed disk drive (e.g., magnetic, optical, magneto-optical, or the like), or streaming tape drive. Mass storage device 107 may store application programs 128, operating system 126 for computer system 100, and program data 130. Application programs 128 and program data 130 stored on mass storage devices 107 may include the application programs 120 and program data 124 stored in RAM 103. One embodiment of the invention may be stored entirely as a software product on mass storage device 107. Embodiments of the invention may be represented as a software product stored on a machine-readable medium (also referred to as a computer-accessible medium, a machine-accessible medium, or a processor-accessible medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. One embodiment of the invention may be embedded in a hardware product, for example, in a printed circuit board, in a special purpose processor, or in a specifically programmed logic device communicatively coupled to bus 101. Processing unit 102 may be any of a wide variety of general-purpose processors or microprocessors (such as the Pentium® processor family manufactured by Intel® Corporation), a special purpose processor, or a specifically programmed logic device. Processing unit 102 is operable to receive instructions which, when executed by the processing unit cause the processing unit to execute application programs 120.

Display device 105 is coupled to processing unit 102 through bus 101 and provides graphical output for computer system 100. Input devices 106 such as a keyboard or mouse are coupled to bus 101 for communicating information and command selections to processing unit 102. Other input devices may include a microphone, joystick, game pad, scanner, or the like. Also coupled to processing unit 102 through bus 101 is an input/output interface (not shown) which can be used to control and transfer data to electronic devices (printers, other computers, etc.) connected to computer system 100. Computer system 100 includes network devices 108 for connecting computer system 100 to one or more remote devices (e.g., the receiving node) 112 via network 114. Remote device 112 may be another personal computer, a server, a router, a network PC, a wireless device or other common network node and typically includes one or more of the elements described above with respect to computer system 100. Network devices 108, may include a network interface for computer system 100, Ethernet devices, network adapters, phone jacks, modems, and satellite links. It will be apparent to one of ordinary skill in the art that other network devices may also be utilized.

Figure 2:
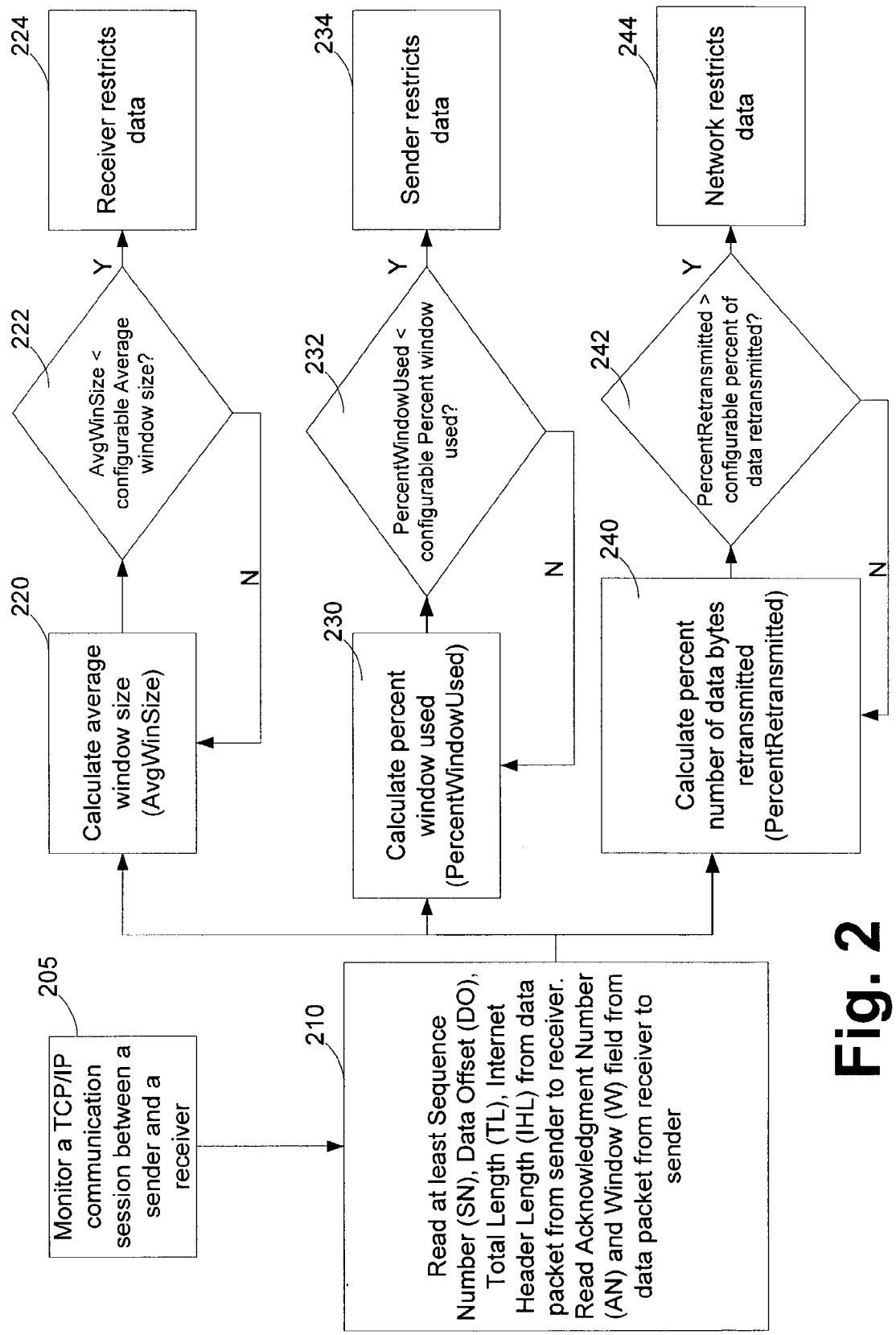
FIG. 2 illustrates a flow diagram for determining whether a sender restricts data flow, whether a receiver restricts data flow, or whether a network restricts data flow according to one embodiment of the invention.

FIG. 2 illustrates a flow diagram for determining whether a sender restricts data flow, whether a receiver restricts data flow, or whether a network restricts data flow according to one embodiment of the invention. As illustrated in FIG. 2, at 205 a device, e.g., computer system 100 monitors the TCP/IP data packets between a sender and a receiver in a network. Computer system 100 may be used as the sender, the receiver, or a tap located at any point in between the sender and the receiver, such that, communications between the sender and the receiver are read by an application program, e.g. application program 120, running on computer system 100. In one embodiment of the invention, the computer system 100 may be configured through a remotely disposed policy server or other device, and may send the information gathered about at least one of, the sender, the receiver, and the network back to the remotely disposed policy server.

In one embodiment of the invention, the application program 120 running on computer system 100 reads the TCP/IP data packets sent between the sender and the receiver as the data packets are received by the network interface of computer system 100. In one embodiment of the invention, in situations where there are a plurality of senders and receivers the application program 120 classifies the communication session between each sender-receiver pair using the sender's and the receiver's IP address and TCP port numbers. In one embodiment of the invention, the application program 120 classifies the communication session between the sender-receiver pair on a half-duplex basis to determine to which data flow each data packet belongs. In situations wherein an acknowledgment from the receiver is used to discern information about the data flow of TCP data packets from the sender, the application program also swaps IP address and TCP ports during classification of the communication session for the purpose of correlating the acknowledgements with the half-duplex connection that carried the data being acknowledged.

In one embodiment of the invention, the application program 120 may maintain a cache of the information contained in data packets for currently active TCP/IP communication sessions between the sender and the receiver. The application program 120 does this by monitoring the TCP SYN and the TCP FIN flags in the data packets. For example, if the TCP SYN flag is set the information contained in the data packet is saved in the cache memory of computer system 100, and if the TCP FIN flag is set the information contained in the data packet is removed from cache memory. In one embodiment of the invention the information contained in the data packet is removed from cache memory when the TCP FIN flag is set in transmissions (i.e., data packets) from both the sender and the receiver for the particular communication session.

For a given sender-receiver pair, at 210, the application program 120 reads at least the Sequence Number field (SN) and a Data Offset field (DO), i.e. the TCP header length, from a TCP header in a data packet from the sender to the receiver. The application program 120 reads a Total Length field (TL) and an Internet Header Length field (IHL) from an IP header in the data packet from the sender to the receiver. The application program 120 also reads an Acknowledgment Number field (AN) and a Window field (W) from a TCP header in a data packet response from the receiver to the sender.

At 220, the application program 120 calculates an average window size (AvgWinSize) value, and at 222 the application program 120 compares the AvgWinSize value calculated in 220 with a configurable average window size value. Details of the calculation of the AvgWinSize value are described with respect to FIG. 3 below. In one embodiment of the invention, the configurable average window size value is a value configured by e.g., a network administrator. In alternate embodiments of the invention, the configurable average window size value is a value that is calculated automatically by the application program by taking e.g., a mean of the average window size value calculated by the application program over a certain period of time. In still other embodiments of the invention, the mean of the average window size values may be calculated from the average window size values calculated for a certain number of communication sessions. If the AvgWinSize value is less than the configurable average window size value, at 224 it is concluded that the receiver restricts data flow and the policy server and/or the network administrator is informed. However, if at 222 it is determined that the AvgWinSize value is not less than the configurable average window size value then the application program 120 calculates the average window size value for the next data packet from the receiver.

At 230, the application program 120 calculates a percent window used value (PercentWindowUsed). Details of the calculation of the PercentWindowUsed value are described with respect to FIG. 4 below. At 232 the application program 120 compares the PercentWindowUsed value with a configurable percent window used value. The determination of the configurable percent window used value is similar to that described with respect to the determination of the configurable average window size value described above. If the PercentWindowUsed value is less than the configurable percent window used value, this indicates at 234 that the sender restricts data flow and the policy server and/or the network administrator is informed. However, if at 232 it is determined that the PercentWindowUsed is not less than the configurable percent window used value then the application program 120 calculates the next percent window used value.

At 240, the application program 120 calculates the percent number of data bytes retransmitted (PercentRetransmitted). Details of the calculation of the PercentRetransmitted are described with respect to FIG. 5 below. At 242 the application program compares the PercentRetransmitted retransmitted with a configurable percent of data bytes retransmitted. The determination of the configurable percent of data bytes retransmitted is similar to that described with respect to the determination of the configurable average window size value described above. If the PercentRetransmitted is greater than the configurable percent of data bytes retransmitted, this indicates at 244 that the network restricts data flow and the policy server and/or the network administrator is informed. However, if at 242 it is determined that the PercentRetransmitted is not greater than the configurable percent of data bytes retransmitted then the application program 120 calculates the next percent of data bytes retransmitted.

Figure 3:
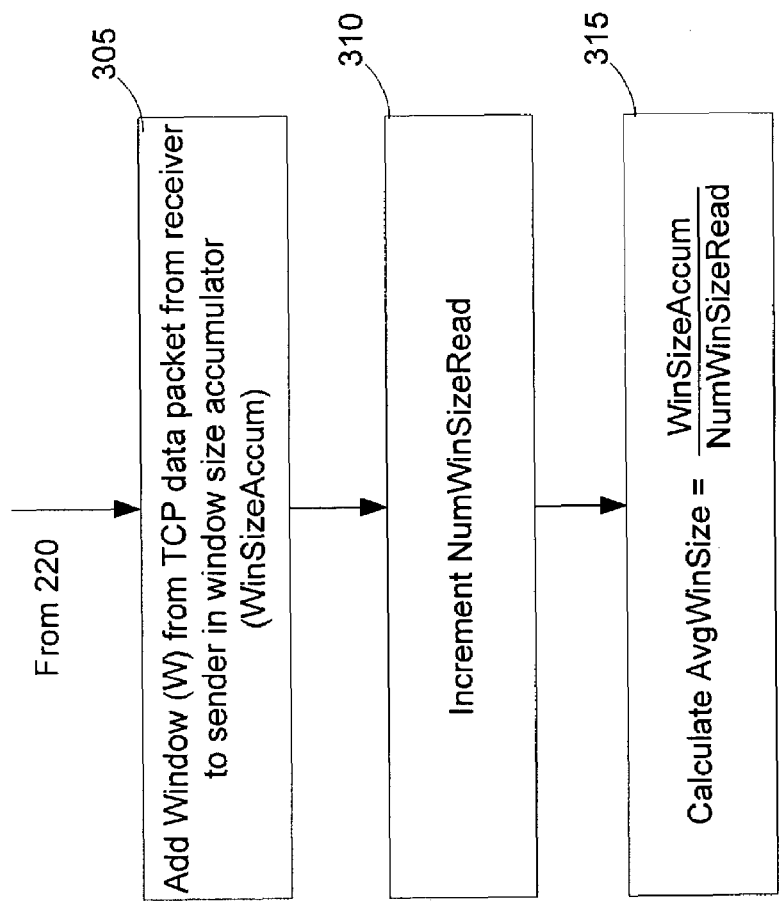
FIG. 3 illustrates a flow diagram for determining whether a receiver in a network restricts data flow according to one embodiment of the invention.

FIG. 3 illustrates a flow diagram for determining whether a receiver in a network restricts data flow according to one embodiment of the invention. As illustrated in FIG. 3, at 305, the application program 120 initializes a counter (WinSizeAccum) and adds the W field from each TCP header of the TCP/IP data packet received to the WinSizeAccum counter. In addition, the application program 120 initializes a second counter (NumWinSizeRead), and at 310 increments the counter to keep a count of the total number of window fields (W) added to the WinSizeAccum counter. At 315, the application program 120 uses the WinSizeAccum counter and the NumWinSizeRead counter to obtain the average window size (AvgWinSize) value as follows:

$$AvgWinSize = \frac{WinSizeAccum}{NumWinSizeRead} \quad [1]$$

In one embodiment of the invention, the time interval between each TCP/IP data packet is calculated and saved so that averages e.g., the average window size, may be calculated taking into account the time interval between the TCP/IP packets (i.e., the average will be weighted based upon time). After calculating the AvgWinSize the application program 120 compares the AvgWinSize with the configurable average window size value described with respect to FIG. 2.

Figure 4:
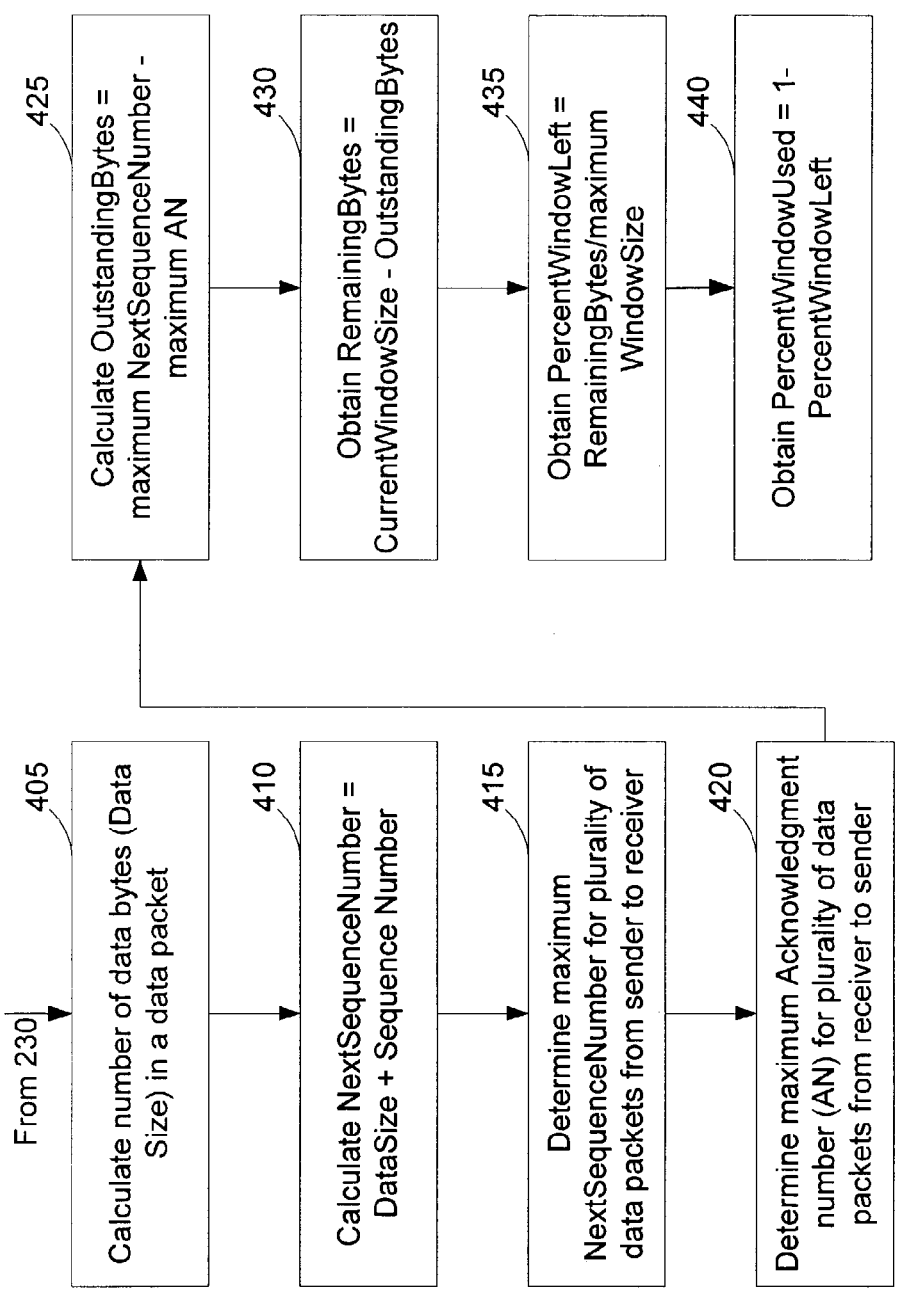
FIG. 4 illustrates a flow diagram for determining whether a sender in a network restricts data flow according to one embodiment of the invention.

FIG. 4 illustrates a flow diagram for determining whether a sender in a network restricts data flow according to one embodiment of the invention. As illustrated in FIG. 4, at 405 the application program 120 calculates the data size (DataSize) i.e., the number of data bytes in the TCP/IP data packet sent by the sender to the receiver. In order to calculate the DataSize the application program 120 subtracts the Internet Header Length (IHL) (in bytes) from the Total Length (TL) field in the IP header of the TCP/IP data packet [2]. In addition, the application program subtracts the Data Offset (DO) (i.e., the length of the TCP header in bytes), obtained from the TCP header of the TCP/IP data packet, from the result obtained in [2] above to obtain the DataSize.

Next at 410, the application program 120 calculates the NextSequenceNumber by adding the DataSize to the Sequence Number (SN) obtained from the TCP header of the TCP/IP data packet from the sender to the receiver. The application program saves the value of the NextSequenceNumber. When the sender sends the next data packet to the receiver, the application program 120 calculates the NextSequenceNumber for this data packet. The application program then compares the two NextSequenceNumber values and at 415 saves the maximum of the two NextSequenceNumbers. The maximum of the two NextSequenceNumbers takes into account sequence number rollovers (since SN is a 32 bit field in the TCP header of the TCP/IP data packet).

Next at 420, the application program 120 obtains the Acknowledgment Number (AN) from the TCP header in a TCP/IP data packet from the receiver to the sender and saves the obtained AN. For the next data packet from the receiver the application program 120 compares the new AN with the AN saved and saves the maximum of the two ANs. The maximum of the two ANs takes into account AN rollovers (since the AN is a 32 bit field in the TCP header of the TCP/IP data packet). In one embodiment of the invention, since the application program 120 determines whether the sender restricts data flow, when acknowledgments from the receiver are read, the application program swaps the IP addresses and TCP ports of the sender and the receiver during classification of these data packets. Swapping the IP addresses and the TCP port numbers of the sender and the receiver during classification of data packet responses from the receiver ensures that the acknowledgments of the data packets are correlated to the half-duplex stream from the sender that contained the data that these acknowledgments pertain to.

Next at 425, the application program 120 calculates Outstanding bytes (OutstandingBytes) by subtracting the maximum AN from the maximum NextSequenceNumber (accounting for rollover of sequence numbers). OutstandingBytes is the number of bytes that have been sent by the sender but not yet acknowledged by the receiver.

Since an application on the receiver may not immediately utilize data sent by the sender when it arrives, despite the receiver's TCP stack sending an acknowledgment, the current window size (CurrentWindowSize) and the maximum window size (MaxWindowSize) are monitored by application program 120. The application program 120 obtains and stores the CurrentWindowSize from the window field (W) in the TCP/IP data packet received from the receiver. For the next data packet from the receiver, the application program 120 compares the W with the stored W and stores the Maximum of the two Ws i.e., the MaxWindowSize.

Next at 430, the application program 120 calculates the remaining bytes (RemainingBytes). To calculate RemainingBytes, the application program 120 subtracts the OutstandingBytes from the CurrentWindowSize.

Next at 435, the application program 120 calculates the percentage of the window left (PercentWindowLeft). The percent window left is a ratio of the RemainingBytes to the MaxWindowSize.

At 440, the application program 120 calculates the percentage of the Window used (PercentWindowUsed). The PercentWindowUsed=1−PercentWindowLeft.

After calculating the PercentWindowUsed the application program 120 compares the PercentWindowUsed with the configurable PercentWindowUsed described with respect to FIG. 2.

Figure 5:
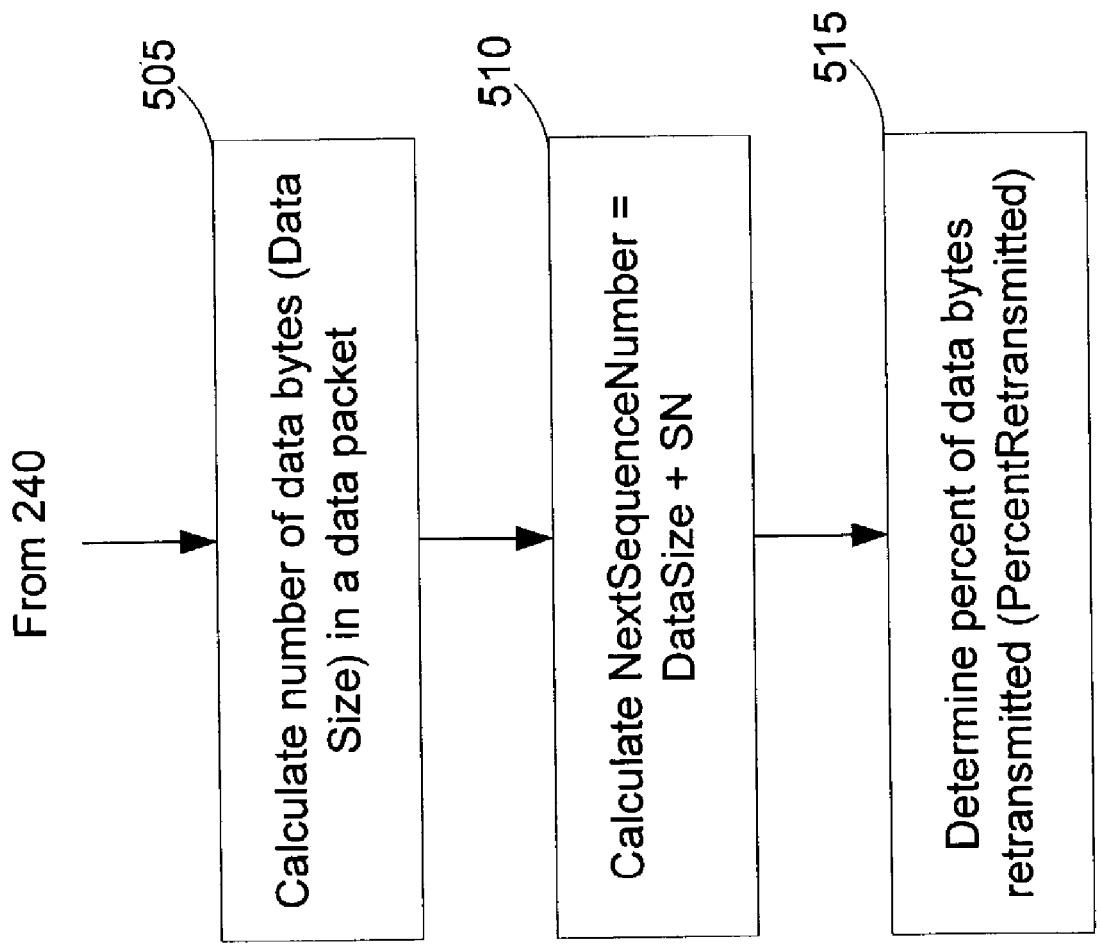
FIG. 5 illustrates a flow diagram for determining whether a network restricts data flow according to one embodiment of the invention.

FIG. 5 illustrates a flow diagram for determining whether a network restricts data flow according to one embodiment of the invention. As illustrated in FIG. 5, at 505 and at 510 the application program 120 calculates the DataSize and the NextSequenceNumber respectively for a TCP/IP data packet from a sender of a data packet as illustrated with respect to FIG. 4. Note: Both the sender and the receiver may transmit data to each other. At 515, the application program 120 determines the number of data bytes dropped (DatabytesDropped), and the percent of data bytes retransmitted (PercentRetransmitted).

To calculate DatabytesDropped, for the next data packet the application program 120 reads the SN from the TCP header of this TCP/IP data packet and compares the SN with the NextSequenceNumber calculated at 510 above. If the SN is sequentially after the NextSequenceNumber (taking into account SN rollover) the application program 120 concludes that an intermediate TCP/IP data packet was dropped. From the NextSequenceNumber and the SN of the received TCP/IP data packet, the application program 120 calculates the number of data bytes in the dropped packet by subtracting the NextSequenceNumber from the SN. Since data packets from the sender may arrive at the receiver out of order, the application program may erroneously conclude that a packet was dropped. However, to account for this the configurable percent of data retransmitted in 242 of FIG. 2 may be adjusted accordingly. Since the sender will retransmit the data in the dropped data packet, a counter (DatabytesDropped) is maintained for the number of data bytes dropped.

If the SN in the next data packet received above is sequentially before the NextSequenceNumber (taking into account SN rollover), this implies that the sender has retransmitted the TCP/IP data packet. The sender retransmits the data packet because of the failure of the receiver to acknowledge the data sent within the TCP defined time-out (either because the original data packet from the sender or the acknowledgment by the receiver was dropped or delayed). The number of data bytes in the retransmitted data packet is added to the DatabytesDropped counter. In one embodiment of the invention, application program 120 uses the total number of data bytes sent and the DatabytesDropped, between the sender and the receiver, to calculate the percentage of data bytes retransmitted as follows:

A count of the total number of data bytes (i.e., a summation of the DataSize from each data packet) sent by the sender to the receiver, TotalBytesSent, is maintained.

$$DatabytesDroppedRatio = \frac{DatabytesDropped}{TotalBytesSent} \quad [3]$$

The ratio of Databytes not dropped is therefore, $$1-\text{DatabytesDroppedRatio} \quad [4]$$

After dividing [3] by [4] and obtaining a percent of the result, application program 120 determines the percent number of data bytes retransmitted. Therefore, $$PercentRetransmitted = \frac{DatabytesDroppedRatio}{1-DatabytesDroppedRatio} \times 100 \quad [5]$$

For example, if DatabytesDropped is 10 and the TotalBytesSent is 30 using equation [3], 10/30 or 1/3 is the DatabytesDroppedRatio. Using equation [4] Databytes not dropped is 1−(1/3) or 2/3. The PercentRetransmitted is $$\frac{1/3}{2/3} \times 100$$

or 50%. This implies that 50% of the original data bytes were retransmitted. Note: This does not mean that half of the original data packets were retransmitted. It could mean that one or more data packets were retransmitted numerous times. After calculating the PercentRetransmitted the application program 120 compares the PercentRetransmitted with a configurable percent of data bytes retransmitted value described with respect to FIG. 2.

Thus, a method and apparatus have been disclosed for determining whether a sending node, a receiving node, or whether a network restricts data flow. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for determining data flow restriction in a sender comprising:

reading a Sequence Number field (SN) and a Data Offset (DO) from a Transmission Control Protocol (TCP) header in a data packet from the sender to a receiver;

reading a Total Length field (TL) and an Internet Header Length field (IHL) from an Internet protocol (IP) header in the data packet from the sender to the receiver;

reading an Acknowledgment Number field (AN) and a Window field (W) from a TCP header in a data packet from the from the receiver to the sender; and using the SN, DO, TL, IHL, AN and W from a network communication session to determine whether the sender restricts an amount of data flow, wherein said using comprises:
calculating number of data bytes (DataSize) in the data packet using the TL, the IHL, and the DO;
adding the DataSize to the SN to obtain a NextSequenceNumber;
determining maximum NextSequenceNumber using TL, IHL, SN, and DO from at least one data packet from the sender to the receiver;
determining maximum AN using AN from at least one data packet from the receiver to the sender;
subtracting the maximum AN from the maximum NextSequenceNumber to obtain outstanding bytes (OutstandingBytes);
subtracting the OutstandingBytes from W to obtain RemainingBytes;
determining maximum W using the at least one data packet from the receiver to the sender; and
calculating PercentWindowUsed using
PercentWindowUsed=1-(RemainingBytes/maximum W).

2. The method of claim 1 further comprising comparing PercentWindowUsed with a configurable PercentWindowUsed value to determine whether the sender restricts the amount of data flow.

3. A method for determining data flow restriction in a receiver comprising:
reading a Window field (W) from a TCP header in a data packet from the receiver to a sender;
using the W from a network communication session to determine whether the receiver restricts an amount of data flow; and
wherein using the W from a network communication session to determine whether the receiver restricts the amount of data flow comprises:
adding W from the data packet and a second data packet from the receiver to the sender to obtain WinSizeAccum;
obtaining NumWinSizeRead by counting the number of times W is added to form the WinSizeAccum; and
calculating average window size (AvgWinSize) using $$AvgWinSize = \frac{WinSizeAccum}{NumWinSizeRead}.$$

4. The method of claim 3 further comprising comparing the AvgWinSize with a configurable AvgWinSize value to determine whether the receiver restricts the amount of data flow.

5. A method for determining data flow restrictions in a network comprising:
reading a Sequence Number field (SN) and a Data Offset field (DO) from a Transmission Control (TCP) header in a first data packet from a sender to a receiver;
reading a Total Length field (TL) and an Internet Header Length field (IHL) from an Internet protocol (IP) header in the first data packet from the sender to the receiver; and
using the SN, DO, TL, and IHL from the first data packet a network communication session to determine whether the network restricts an amount of data flow, wherein said using comprises:
calculating number of data bytes (DataSize) in the first data packet from the sender to the receiver using the TL, the IHL, and the DO;
adding the DataSize to the SN to obtain a NextSequenceNumber;
comparing the NextSequenceNumber with a SN from a second data packet from the sender to the receiver;
calculating percent of data bytes retransmitted (PercentRetransmitted) wherein said calculating percent of data bytes retransmitted (PercentRetransmitted) comprises:
comparing the NextSequenceNumber obtained using the first data packet with the SN from the second data packet;
determining number of data bytes dropped (DatabytesDropped) by subtracting from the NextSequenceNumber from the first data packet the SN from the second data packet; and
calculating PercentRetransmitted using the DatabytesDropped; and
determining whether the network restricts the amount of data flow using the PercentRetransmitted.

6. The method of claim 5 wherein determining whether the network restricts the amount of data flow comprises comparing the PercentRetransmitted with a configurable PercentRetransmitted.

7. An apparatus to determine data flow restriction in a sender comprising;
a network device; and
a processor coupled to the network device said processor to:
read a Sequence Number field (SN) and a Data Offset field (DO) from a Transmission Control Protocol (TCP) header in a data packet from the sender to a receiver;
read an Total Length field (TL) and Internet Header Length field (IHL) from and Internet protocol (IP) header in the data packet from the sender to the receiver;
read an Acknowledgment Number field (AN) and a Window field (W) from a TCP header in a data packet from the receiver to the sender; and
use the SN, DO, TL, IHL, AN, and W from a network communication session to determine whether the sender restricts an amount of data flow by;
calculating number of data bytes (DataSize) in the data packet using the TL, the IHL, and the DO;
adding the DataSize to the SN to obtain a NextSequenceNumber;
determining maximum NextSequenceNumber using TL, IHL, SN, and DO from at least one data packet from the sender to the receiver;
determining maximum AN using AN from at least at least one data packet from the receiver to the sender;
subtracting the maximum AN from the maximum NextSequenceNumber to obtain outstanding bytes (OutstandingBytes);
subtracting the OutstandingBytes from W to obtain RemainingBytes;
determining maximum W using the at least one data packet from the receiver to the sender; and
calculating PercentWindowUsed using PercentWindowUsed=1-(RemainingBytes/maximum W).

8. The apparatus of claim 7 further comprising the processor to compare PercentWindowUsed with a configurable PercentWindowUsed value to determine whether the sender restricts the amount of data flow.

9. An apparatus to determine data flow restriction in a receiver comprising:
   a network device; and
   a processor coupled to the network device said processor to read a Window field (W) from a TCP header in a data packet from the receiver to a sender;
      use the W from a network communication session to determine whether the receiver restricts an amount of data flow; and
      wherein the processor to use the W from a network communication session to determine whether the receiver restricts the amount of data flow comprises said processor to:
         add W from the data packet and a second data packet from the receiver to the sender to obtain WinSizeAccum;
         obtain NumWinSizeRead by counting the number of times W is added to form the WinSizeAccum; and
         calculate average window size (AvgWinSize) using $$AvgWinSize = \frac{WinSizeAccum}{NumWinSizeRead}.$$

10. The apparatus of claim 9 further comprising comparing the AvgWinSize with a configurable AvgWinSize value to determine whether the receiver restricts the amount of data flow.

11. An apparatus to determine data flow restrictions in a network comprising:
    a network device; and
    a processor coupled to the network device said processor to:
       read a Sequence Number field (SN) and a Data Offset field (DO) from a Transmission Control Protocol (TCP) header in a first data packet from a sender to a receiver;
       read a Total Length field (TL) and an Internet Header Length field (IHL) from an Internet protocol (IP) header in the first data packet from the sender to the receiver;
       use the SN, DO, TL, and IHL from the first data packet of a network communication session to determine whether the network restricts an amount of data flow, wherein said use comprises;
          calculate number of data bytes (DataSize) in the first data packet from the sender to the receiver using the TL, the IHL, and the DO;
          add the DataSize to the SN to obtain a NextSequenceNumber;
          compare the NextSequenceNumber with a SN from a second data packet from the sender to the receiver;
          calculate percent of data bytes retransmitted (PercentRetransmitted) wherein said calculate percent of data bytes retransmitted (PrecentRetransmitted) comprises:
             compare the NextSequenceNumber obtained using the first data packet with the SN from the second data packet;
             determine number of data bytes dropped (DatabytesDropped) by subtracting from the NextSequenceNumber from the first data packet the SN from the second data packet; and calculate PercentRetransmitted using the DatabytesDropped; and
          determined whether the network restricts the amount of data flow using the PercentRetransmitted.

12. The apparatus of claim 11 wherein said processor to determine whether the network restricts the amount of data flow comprises said processor to compare the PercentRetransmitted with a configurable PercentRetransmitted.

13. An article of manufacture for determining data flow restriction is s sender comprising:
    a machine-accessible medium including instructions that, when executed by a machine, causes the machine to perform operations comprising:
       reading a Sequence Number field (SN) and a Data Offset field (DO) from a Transmission Control Protocol (TCP) header in a data packet from the sender to a receiver;
       reading a Total Length field (TL) and an Internet Header Length field (IHL) from an Internet protocol (IP) header in the data packet from the sender to the receiver;
       reading an Acknowledgment number field (AN) and a Window field (W) form a TCP header in a data packet from the receiver to the sender; and
       using the SN, DO, TL, IHL, AN, and W from a network communication session to determine whether the sender restricts an amount of data flow, wherein said instructions for using the SN, DO, TL, IHL, AN and W from a network communication session to determine whether the sender restricts the amount of data flow comprises further instructions for;
          calculating number of data bytes (DataSize) in the data packet using the TL, the IHL, and the DO;
          adding the DataSize to the SN to obtain a NextSequenceNumber;
          determining maximum NextSequenceNumber using TL, IHL, SN, and DO from at least one data packet from the sender to the receiver;
          determining maximum AN using AN from at least at least one data packet from the receiver to the sender;
          subtracting the maximum AN from the maximum NextSequenceNumber to obtain outstanding bytes (OutstandingBytes);
          subtracting the OutstandingBytes from W to obtain RemainingBytes;
          determining maximum W using the at least one data packet from the receiver to the sender; and
          calculating PercentWindowUsed using
          PercentWindowUsed=1−(RemainingBytes/maximum W).

14. The article of manufacture of claim 13 comprising further instructions for comparing PercentWindowUsed with a configurable PercentWindowUsed value to determine whether the sender restricts the amount of data flow.

15. An article of manufacture for determining data flow restriction in a receiver comprising:
    a machine-accessible medium including instructions that, when executed by a machine, causes the machine to perform operations comprising
       reading a Window field (W) from a TCP header in a data packet from a receiver to a sender;
       using the W from a network communication session to determine whether the receiver restricts an amount of data flow; and wherein said instructions for using the W from a network communication session to determine whether the receiver restricts the amount of data flow comprises further instructions for:
adding W from the data packet and a second data packet from the receiver to the sender to obtain WinSizeAccum;
obtaining NumWinSizeRead by counting the number of times W is added to form the WinSizeAccum; and
calculating average window size (AvgWinSize) using $$AvgWinSize = \frac{WinSizeAccum}{NumWinSizeRead}.$$

16. The article of manufacture of claim 15 comprising further instructions for comparing the AvgWinSize with a configurable AvgWinSize value to determine whether the receiver restricts the amount of data flow.

17. An article of manufacture for determining data flow restrictions in a network comprising:
a machine-accessible medium including instructions that, when executed by a machine, causes the machine to perform operations comprising:
reading a Sequence Number field (SN) and a Data Offset field (DO) from a Transmission Control Protocol (TCP) header in a first data packet from a sender to a receiver;
reading a Total Length field (TL) and an Internet Header Length field (IHL) from an Internet protocol (IP) header in the first data packet from the sender to the receiver;
using the SN, DO, TL, and IHL from the first data packet of a network communication session to determine whether the network restricts an amount of data flow, wherein said instructions for using the SN, DO, TL, and IHL from the first data packet of a network communication session to determine whether the network restricts an amount of data flow comprises further instructions for:
calculating number of data bytes (DataSize) in the first data packet from the sender to the receiver using the TL, the IHL, and the DO;
adding the DataSize to the SN to obtain a NextSequenceNumber;
comparing the NextSequenceNumber with a SN from a second data packet from the sender to the receiver;
calculating percent of data bytes retransmitted (PercentRetransmitted) wherein said instructions for calculating percent of data bytes retransmitted (PercentRetransmitted) comprises further instructions for:
comparing the NextSequenceNumber obtained using the first data packet with the SN from the second data packet;
determining number of data bytes dropped (DatabytesDropped) by subtracting from the NextSequenceNumber from the first data packet the SN from the second data packet; and
calculating PercentRetransmitted using the DatabytesDropped; and
determining whether the network restricts the amount of data flow using the PercentRetransmitted.

18. The article of manufacture of claim 17 wherein determining whether the network restricts the amount of data flow comprises further instructions for comparing the PercentRetransmitted with a configurable PercentRetransmitted.

19. A system comprising
a network device; and
a processor coupled to the network device said processor to:
read a Sequence Number field (SN) and a Data Offset field (DO) from a Transmitted Control Protocol (TCP) header in a data packet from a sender to a receiver;
read a Total Length field (TL) and an Internet Header Length field (IHL) from an Internet protocol (IP) header in the data packet from the sender to the receiver;
read an Acknowledgment Number field (AN) and a Window field (W) from a TCP header in a data packet from the receiver to the sender;
use the SN, DO, TL, IHL, AN, and W from a network communication session to determine whether the sender restricts an amount of data flow, wherein the processor to use the SN, DO, TL, IHL, AN, and W from a network communication session to determine whether the sender restricts the amount of data flow comprises the processor to:
calculate number of data bytes (DataSize) in the data packet using the TL, the IHL, and the DO;
add the DataSize to the SN to obtain a NextSequenceNumber;
determine maximum NextSequenceNumber using TL, IHL, SN, and DO from at least one data packet from the sender to the receiver;
determine maximum AN using AN from at least at least one data packet from the receiver to the sender;
subtract the maximum AN from the maximum NextSequenceNumber to obtain outstanding bytes (OutstandingBytes);
subtract the OutstandingBytes from W to obtain RemainingBytes;
determine maximum W using the at least one data packet from the receiver to the sender; and
calculate PercentWindowUsed using PercentWindowUsed=1−(RemainingBytes/maximum W);
use the W from the network communication session to determine whether the receiver restricts the amount of data flow; and
use the SN, DO, TL, and IHL from the network communication session to determine whether the network restricts the amount of data flow.

20. The system of claim 19 wherein the processor to use the W from the network communication session to determine whether the receiver restricts the amount of data flow comprises said processor to:
add W from the data packet and a second data packet from the receiver to the sender to obtain WinSizeAccum;
obtain NumWinSizeRead by counting the number of times W is added to form the WinSizeAccum; and
calculate average window size (AvgWinSize) using $$AvgWinSize = \frac{WinSizeAccum}{NumWinSizeRead}.$$

21. The system of claim 20 wherein said processor to use the SN, DO, TL, and IHL from the network communication session to determine whether the network restricts the amount of data flow comprises said processor to:
- calculate number of data bytes (DataSize) in the data packet from the sender to the receiver using the TL, the IHL, and the DO;
- add the DataSize to the SN to obtain a NextSequenceNumber;
- compare the NextSequenceNumber with a SN from a second data packet from the sender to the receiver;
- calculate percent of data bytes retransmitted (PercentRetransmitted); and
- determine whether the network restricts the amount of data flow using the PercentRetransmitted.

22. The system of claim 21 wherein said processor to calculate percent of data bytes retransmitted (PercentRetransmitted) comprises said processor to:
- compare the NextSequenceNumber obtained using the data packet with the SN from the second data packet;
- determine number of data bytes dropped (DatabytesDropped) by subtracting from the NextSequenceNumber from the data packet, the SN from the second data packet; and
- calculate PercentRetransmitted using the DatabytesDropped.

* * * * *

UNITED STATES PATENT AND TRADEMARK OFFICE
CERTIFICATE OF CORRECTION

PATENT NO. : 7,307,952 B2
APPLICATION NO. : 10/324974
DATED : December 11, 2007
INVENTOR(S) : Gross et al.

It is certified that error appears in the above-identified patent and that said Letters Patent is hereby corrected as shown below:

<u>Column 8</u>
Line 67, "...from the from the..." should read --...from the...--.

<u>Column 9</u>
Line 58, "...Transmission Control (TCP)..." should read --...Transmission Control Protocol (TCP)...--.

<u>Column 10</u>
Line 36, "...read an Total..." should read --...read a Total...--.
Line 36, "...and Internet..." should read --...and an Internet...--.
Line 45, "...by;..." should read --...by:...--.
Line 53, "...at least one at least one..." should be --...at least one...--.

<u>Column 12</u>
Line 10, "...is s sender..." should be --...in a sender...--.
Line 31, "...for;..." should be --...for:...--.

<u>Column 14</u>
Line 35, "...at least one at least one..." should be --...at least one...--.

Signed and Sealed this

Twentieth Day of May, 2008

JON W. DUDAS
*Director of the United States Patent and Trademark Office*